Oct. 13, 1942. W. F. LONGFIELD 2,298,492
AUTOMATIC CONTROLLING APPARATUS FOR STRIP FEEDING MECHANISM
Filed Aug. 2, 1940 11 Sheets-Sheet 1

INVENTOR
WILLIAM F. LONGFIELD
BY Chas. H. Trotter
ATTORNEY

Oct. 13, 1942.   W. F. LONGFIELD   2,298,492
AUTOMATIC CONTROLLING APPARATUS FOR STRIP FEEDING MECHANISM
Filed Aug. 2, 1940   11 Sheets-Sheet 2

INVENTOR.
WILLIAM F. LONGFIELD
BY Chas. H. Trotter
ATTORNEY.

Oct. 13, 1942.  W. F. LONGFIELD  2,298,492
AUTOMATIC CONTROLLING APPARATUS FOR STRIP FEEDING MECHANISM
Filed Aug. 2, 1940  11 Sheets-Sheet 3

INVENTOR
WILLIAM F. LONGFIELD
BY
ATTORNEY

Oct. 13, 1942.   W. F. LONGFIELD   2,298,492
AUTOMATIC CONTROLLING APPARATUS FOR STRIP FEEDING MECHANISM
Filed Aug. 2, 1940   11 Sheets-Sheet 4
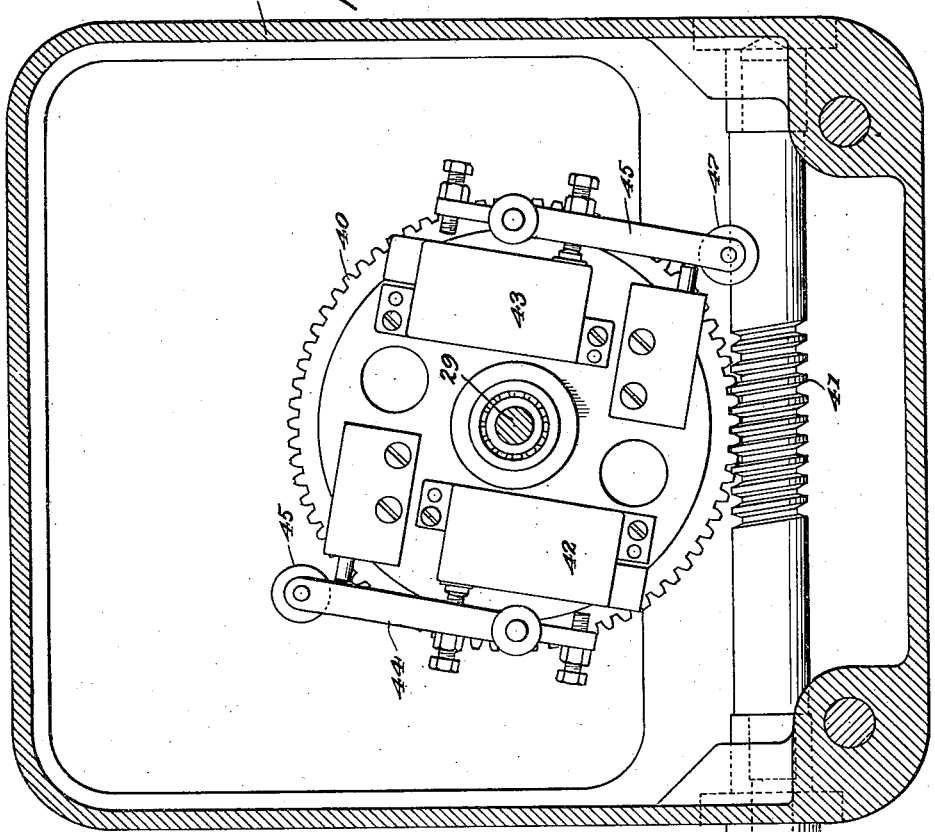
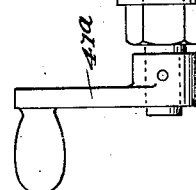
INVENTOR
WILLIAM F. LONGFIELD
BY
ATTORNEY

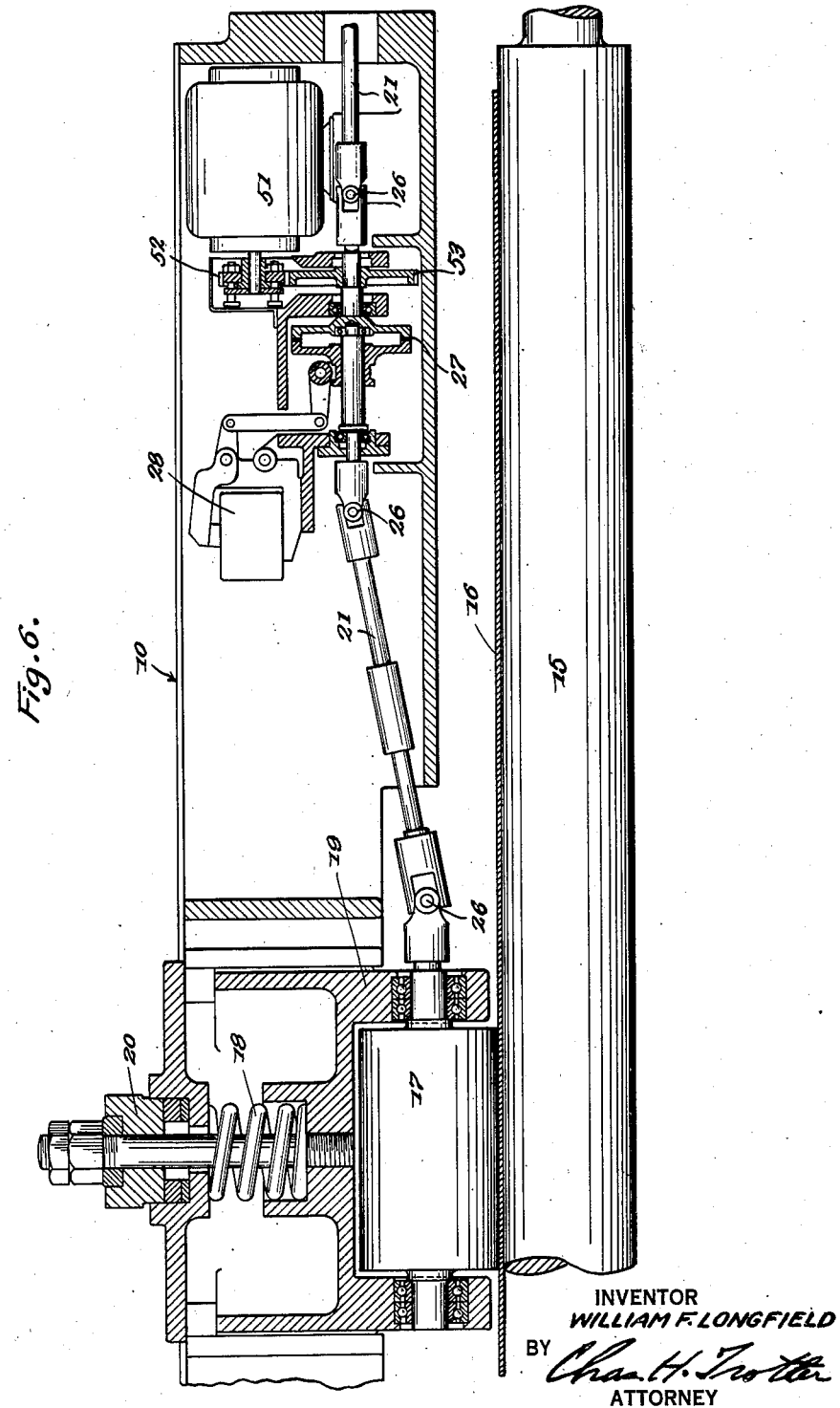

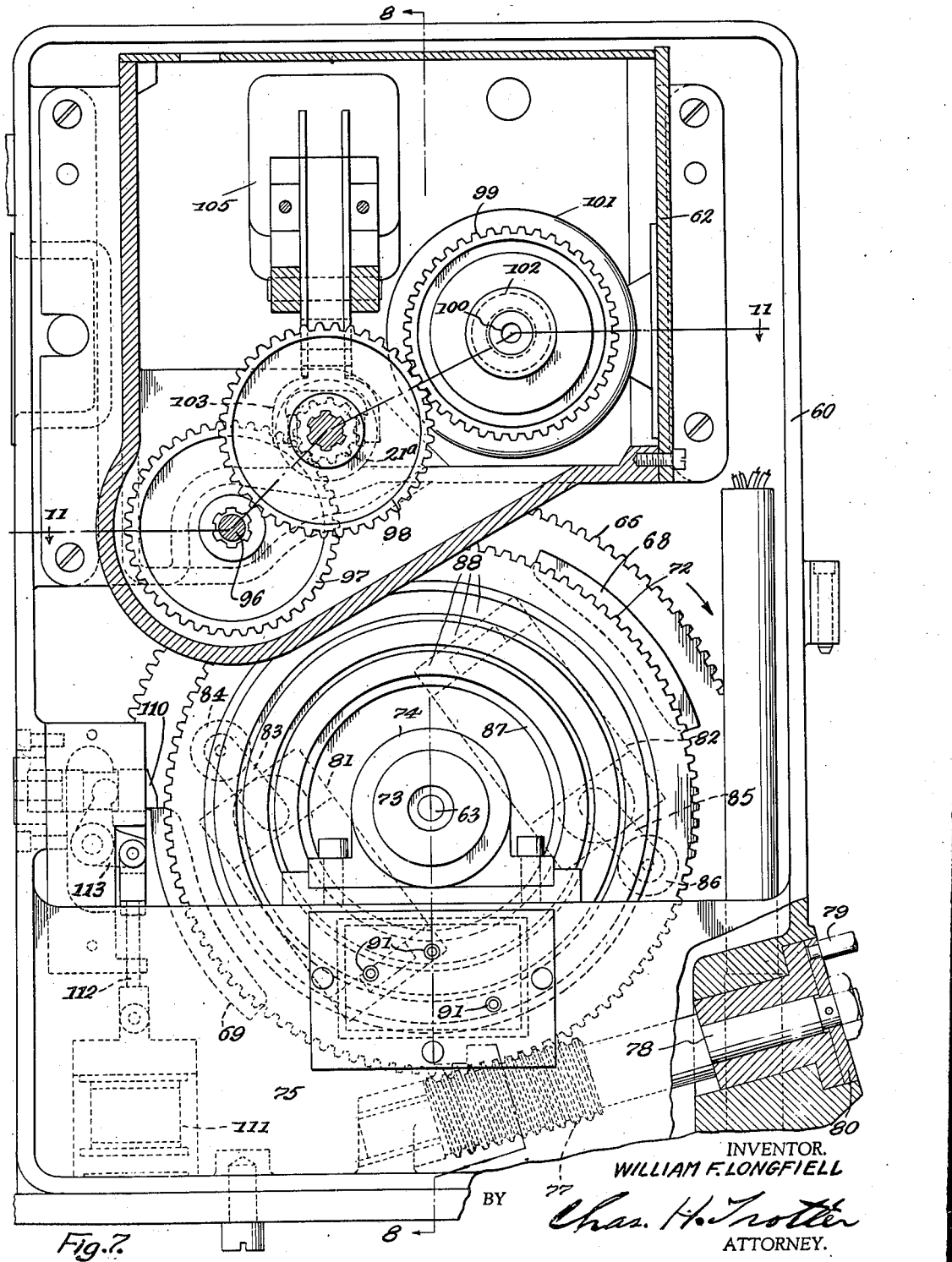

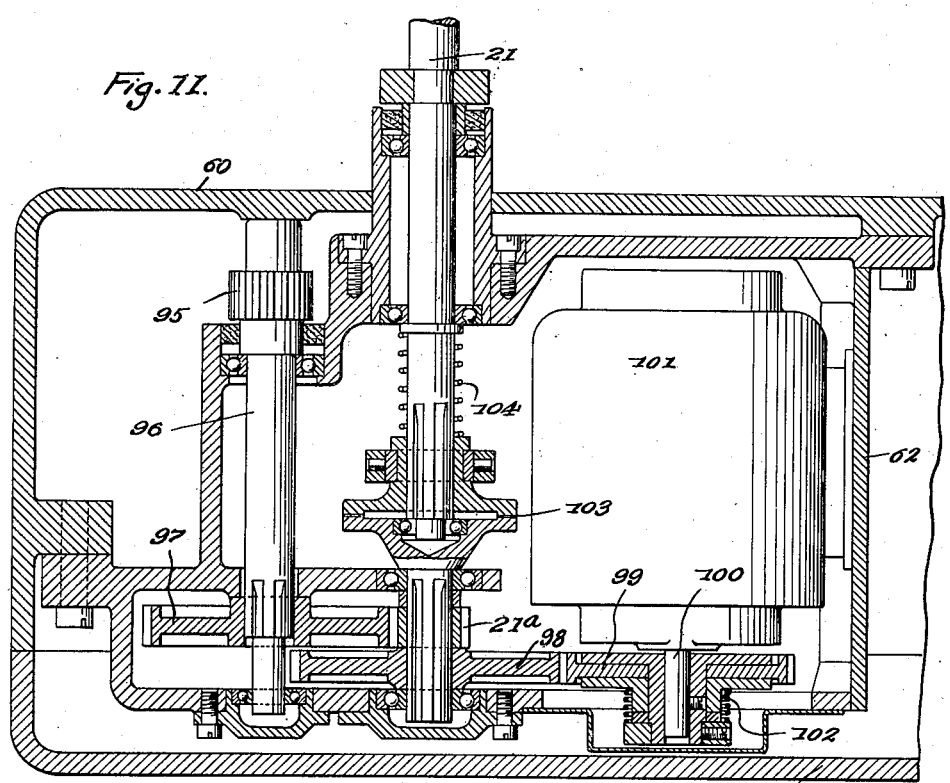

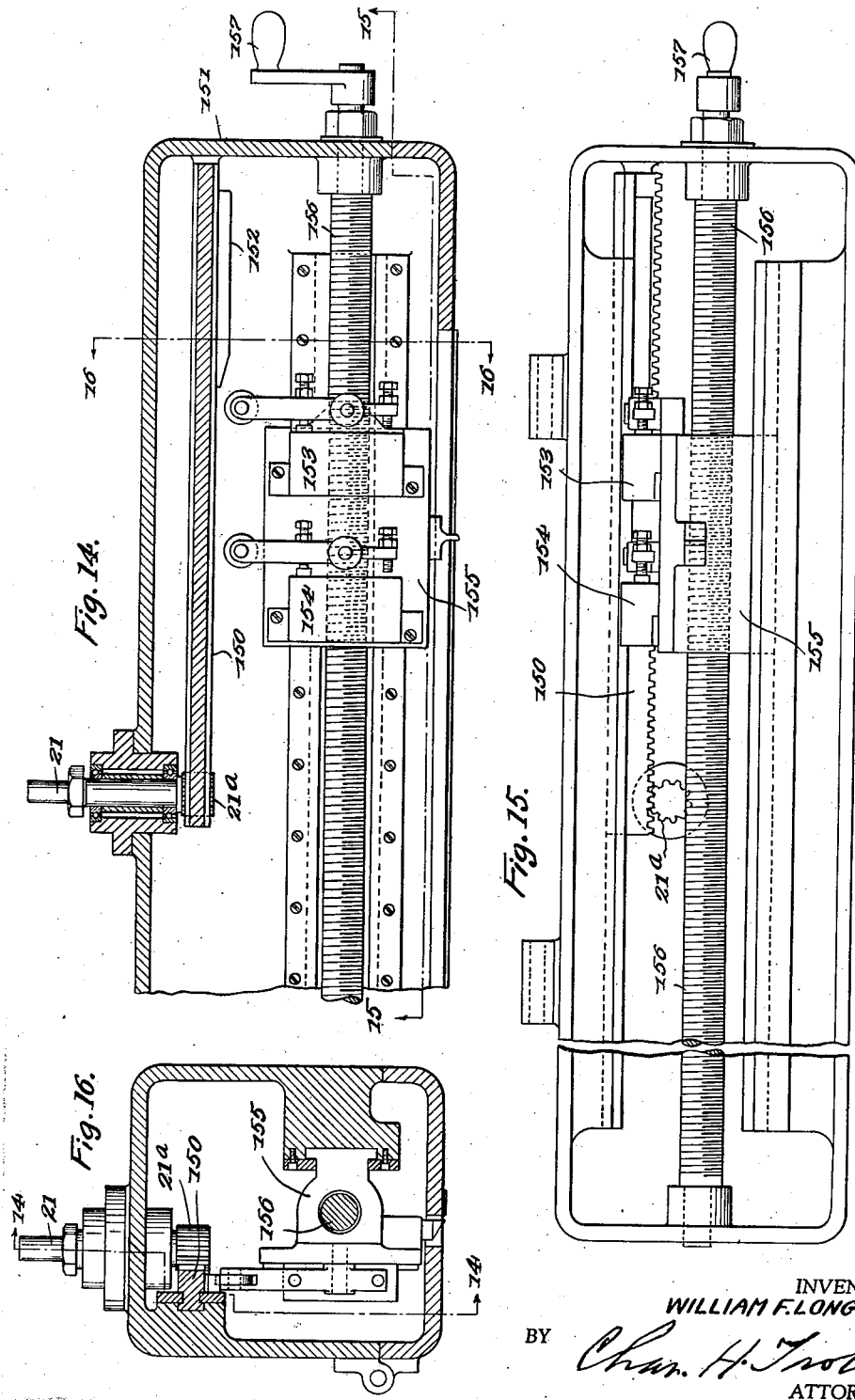

Patented Oct. 13, 1942

2,298,492

UNITED STATES PATENT OFFICE 2,298,492

AUTOMATIC CONTROLLING APPARATUS FOR STRIP FEEDING MECHANISM

William F. Longfield, Cleveland, Ohio, assignor to The Cleveland Punch & Shear Works Company, Cleveland, Ohio, a corporation of Ohio Application August 2, 1940, Serial No. 349,873

15 Claims. (Cl. 271—2.3)

This invention relates generally to metal working machines, and more particularly to feeding and measuring mechanisms, generally known as roll feed mechanisms, which are used for feeding continuous strips in predetermined lengths to sheet metal working machines.

The principal object of the invention is the provision of a device of this character which will accurately feed predetermined lengths of sheet metal to metal working machines, such as draw presses, shears, and the like.

Another object of this invention is the provision of a device of this character that can be readily and accurately set to feed any desired predetermined length of sheet metal to any metal working machine.

Another object of the invention is the provision of a feeding and measuring device for metal working machines which can be operated in timed relation to the machine associated therewith.

Another object of the invention is the provision of a measuring device of this character, which can be readily disconnected from its associated feeding device whenever desired, such as during the initial loading of the machine or when it is necessary to reverse the direction of the machine so as to remove defective stock therefrom.

Another object of the invention is the provision of a measuring device for use in conjunction with metal straightening and feeding rolls, which is simple and efficient and economical to manufacture, and which due to its construction will not need frequent repairs and adjustments.

Other and more limited objects of the invention will be apparent from the following specification and the drawings forming a part thereof, wherein Figure 1 is a side elevation, of a large sheet metal working press and a stock feeding mechanism, having my invention embodied therein.

Figure 5 is a section taken on the line 5—5 of Figure 3.

Figure 6 is a fragmentary vertical section through a portion of the stock feeding mechanism showing the mechanism for driving the control mechanism shown in Figures 3 to 5.

Figure 7 is a sectional front elevation of another form of my invention, the cover being removed, and taken substantially in the plane indicated by the line 7—7 of Figure 8.

Figure 11 is a section taken on the line 11—11 of Figure 7.

Figure 12 is a wiring diagram showing the manner in which my invention operates.

Figure 13 is a fragmentary elevational view of the pointer and dial, which shows the setting of the machine.

Figure 14 is a fragmentary horizontal sectional view through still another form of my invention.

Figure 15 is a sectional front elevation of the structure shown in Figure 14 with the cover removed, taken in the plane indicated by the line 15—15 of Figure 14.

Figure 16 is a transverse section taken on the line 16—16 of Figure 14.

Figure 1:
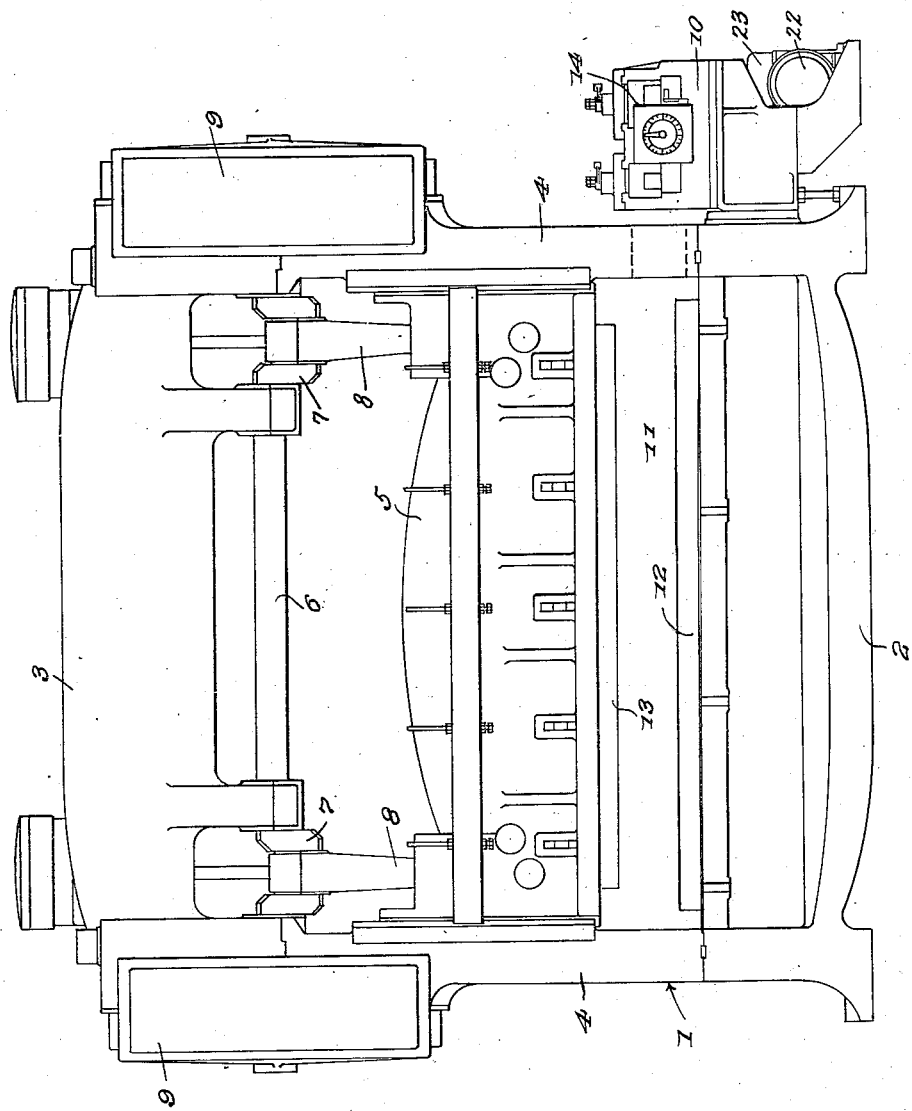
Figure 3:
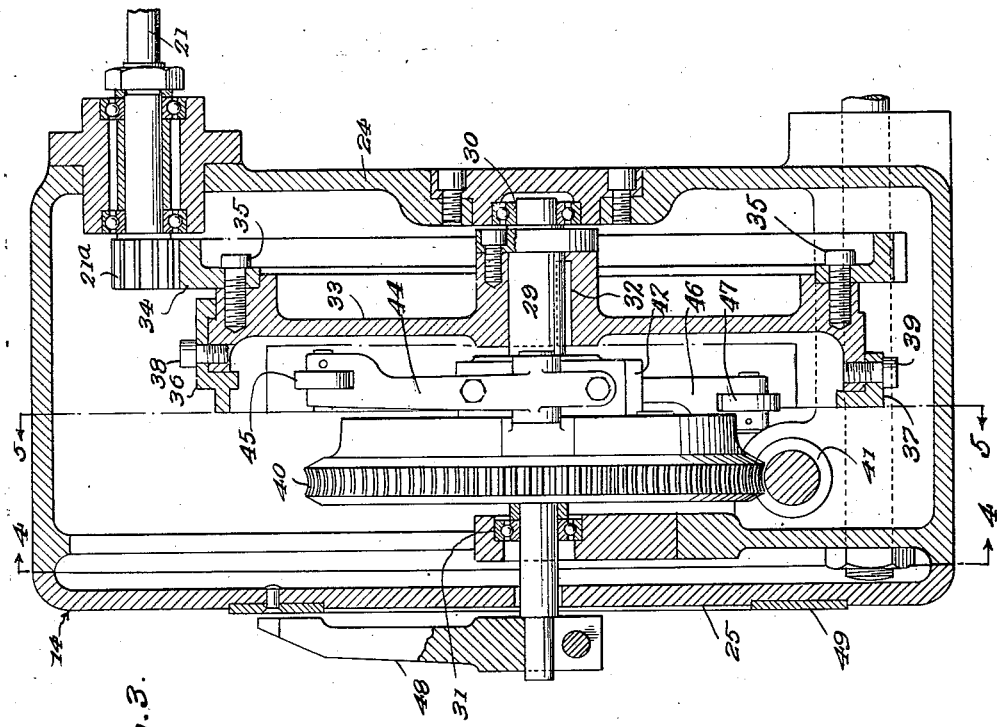
Figure 3 is a transverse section through the stock feeding control mechanism taken in the plane indicated by the line 3—3 on Figure 4.
Figure 2:
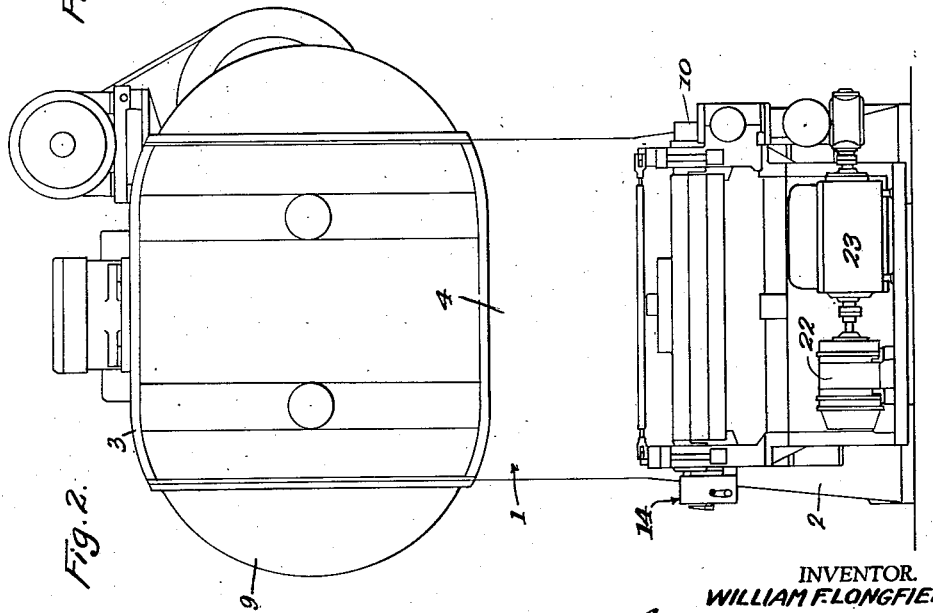
Figure 2 is an end elevation of the parts shown in Figure 1 looking from the right of Figure 1.

Referring to the drawings now by the use of reference characters, the numeral 1 indicates generally a standard type of large metal working press. This press comprises the usual base 2, crown 3 and uprights 4, between which is mounted a reciprocating ram 5 which is driven from crank-shafts 6 through cranks 7 and connecting rods 8. The crank-shafts 6 are driven through suitable gearing which is enclosed within gear housings 9.

Mounted adjacent the press is a stock feeding mechanism 10 which may be any one of various different designs which are now available. All stock feeding mechanisms of this type have incorporated therein a plurality of rolls which draw the stock, sheet steel, therethrough and feed it into the die space 11 between the lower stationary die 12, which is carried by the base 2 and the reciprocating die 13, which is secured to the ram 5.

All of the foregoing parts which have just been described form no part of my invention, and consequently, it is not believed necessary to illustrate or describe them more in detail. Obviously, presses and feeding mechanism of this kind can be and are used for various types and sizes of work. Consequently, the amount of stock fed into the press between each stroke of the press depends on the particular job being performed by the press. This means that for proper operation of a device of this character, it is necessary to have some control means which will feed the proper predetermined amount of stock into the press for the particular job being performed by the press. Furthermore, it will naturally follow that this control means must be readily adjustable so that the amount of material being fed to the press can be varied as occasion demands.

My invention relates to the particular mechanism for controlling the operation of the feeding mechanism 10 and is indicated generally by the numeral 14 in Figure 1. It consists of various mechanisms, to be hereinafter described, which are driven by the stock itself as it is fed into the press by the rolls in the feeding mechanism. One of these rolls is indicated by the numeral 15 in Figure 6 and the stock, which is flat sheet metal, is indicated by the numeral 16. A roller 17 is pressed into engagement with the stock 16 by a spring 18. The roller 17 is rotatably journaled in a carriage 19 which can be raised and lowered into and out of engagement with the stock by mechanism 20. As the stock is fed through by the rollers 15, it will rotate the roller 17, which in turn will rotate a shaft 21, which shaft 21 rotates a moveable member within the timer mechanism 14 in proportion to the movement of the stock 16. The numeral 26 indicates universal joints in the shaft 21, which will enable the roller 17 to be readily moved into and out of engagement with the stock 16. A clutch 27 is interposed intermediate the ends of shaft 21 so that the roller 17 will drive the end of the shaft 21, which is adjacent the timer control mechanism, through this clutch. This clutch is engaged and disengaged by means of a solenoid 28. The purpose of this clutch will be explained hereinafter. The rolls 15 in the feeding mechanism 10 are driven by a motor 22 through a suitable transmission 23. This transmission 23 may be either a mechanical transmission or a fluid transmission.

In feeding stock to sheet metal working machines it is desirable to feed it in as quickly as possible so as not to retard production, but it has been found by experience that it is not possible to accurately feed stock into a machine at high speed for its entire length. When this is done, you cannot accurately measure the stock as you will usually get more than the machine is set to measure, which will cause a wasting of stock. Consequently, the usual practice is to feed the majority of the stock in at high speed and then slow the machine down for the last six to twelve inches of stock being fed in and then stop it when it is going at low speed. This in itself has been known and practiced for many years in the feeding of sheet metal. My invention relates to the particular mechanism for first slowing down the feeding of the stock and then stopping the feeding of stock, and the means for quickly and accurately adjusting the mechanism for feeding any desired length of stock into a metal working machine.

This control mechanism, generally indicated by the numeral 14, is contained within a housing 24 which is bolted to the side of the feeding mechanism 10 and which has a hinged cover 25 thereon. A shaft 29 is journaled in bearings 30 and 31 within the housing 24. Keyed to this shaft 29, as indicated at 32, is a disc like member 33 which has a gear 34 secured to the rear face thereof by screws 35 and a pair of cam members 36 and 37 secured to the periphery thereof by screws 38 and 39.

Loosely mounted on the shaft 29 is a worm gear 40 which meshes with a worm 41 which is journaled in the housing 24 beneath the worm gear 40 and has a crank 41ª secured to one end thereof through which the worm gear 40 may be rotated when desired.

Figure 4:
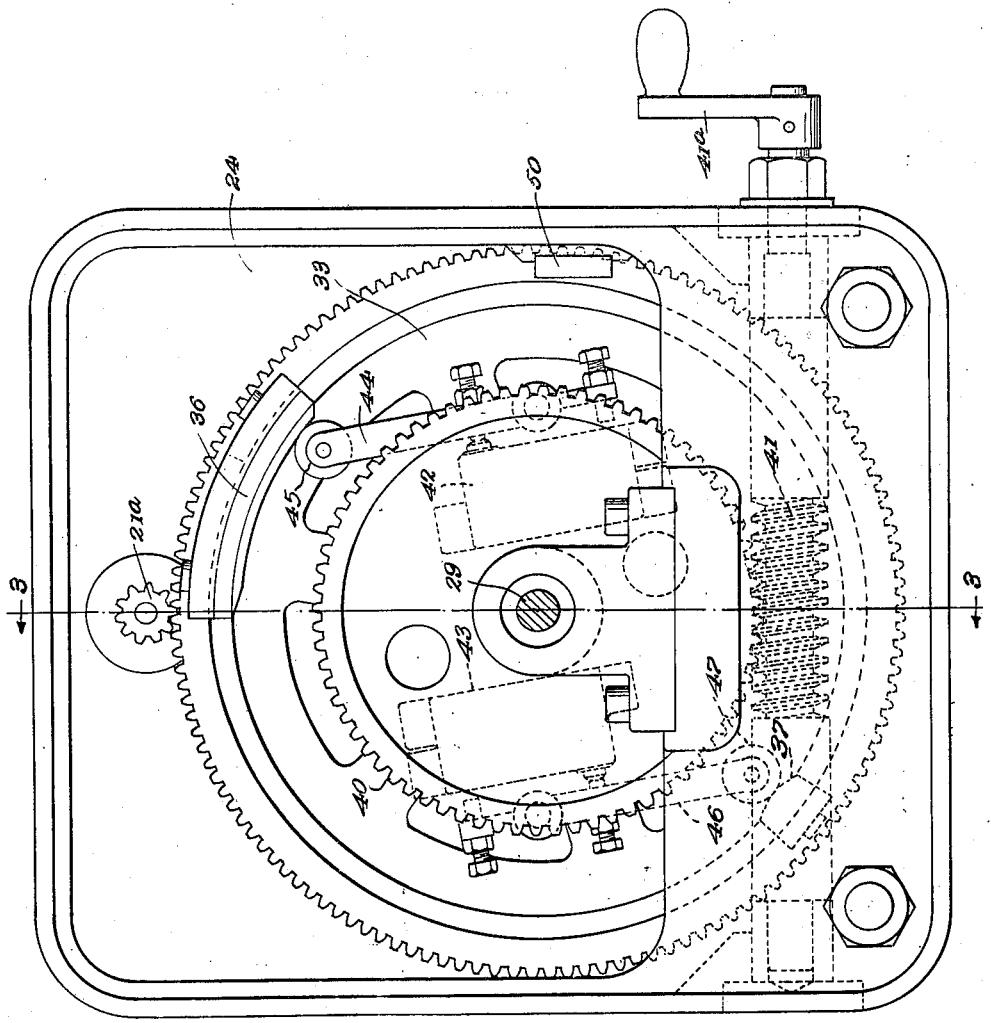
Figure 4 is a sectional front elevation of the control mechanism with the front cover removed, being taken in the plane 4—4 of Figure 3.
Figure 8:
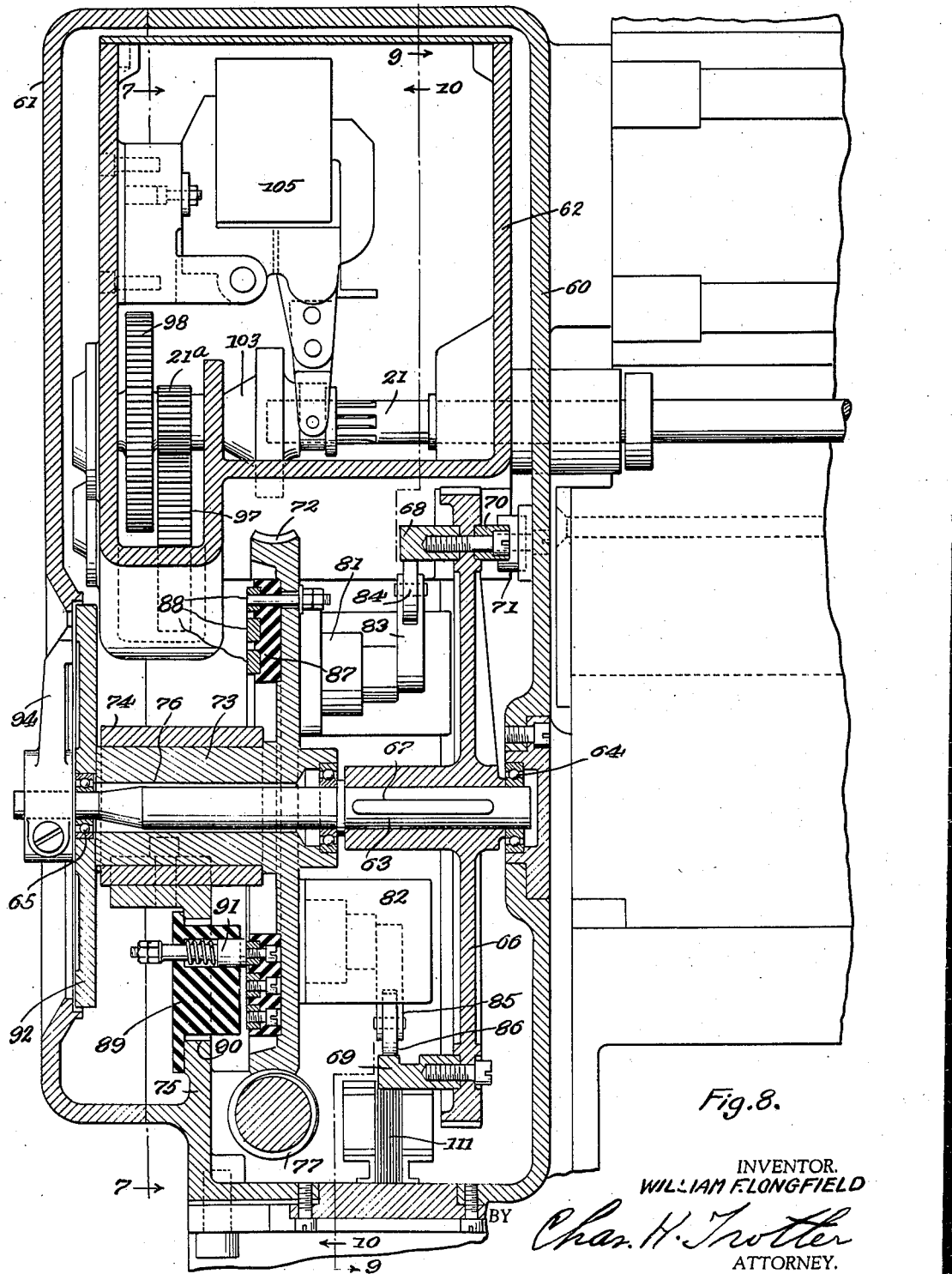
Figure 8 is a central vertical section taken on the line 8—8 of Figure 7.

Rigidly secured to the rear face of the worm gear 40 are a pair of switch members 42 and 43. The switch 42 has pivotally secured thereto an operating lever 44 having a roller 45 on the outer end thereof and the switch 43 has a similar operating lever 46 pivoted thereto and this lever 46 has a roller 47 secured to the outer end thereof. The shaft 29 has rigidly secured thereto on the outer end thereof a hand 48. This hand 48 cooperates with a dial 49 on the cover 25 which dial may be calibrated as desired. This hand 48 will rotate with the shaft 29 and will indicate the length of stock being fed into the machine. The operation of the device is as follows: After each measuring operation the disc 33 will be returned to starting position by mechanism which will be hereinafter described. This position is with the cam 36 (Figure 4) against a stop 50 secured to the inner wall of the casing 24. The machine is now ready to operate. The driving motor 22 is started manually. This will drive the rolls 15 which in turn feed the stock 16. The stock 16 will rotate the roller 17 and it in turn will rotate the shaft 21 and pinion gear 21ª which is in mesh with the gear 34. This will drive the gear 34 in a counterclockwise direction as viewed in Figure 4. After a predetermined amount of movement the cam 36 will engage the roller 45 on the operating lever 44 of the switch 42 thus operating the switch 42. The operation of the switch 42 will slow down the driving mechanism for the rolls 15 so that the balance of the stock will be fed at a slower speed. The continued movement of the stock, and consequently, of the gear 34 will bring the cam 37 into engagement with the roller 47 on the operating lever 46 of the switch 43 and thus operate the switch 43. This will stop the machine. It will be seen by Figure 4 that the cams 36 and 37 are so positioned and arranged that the cam 36 will operate switch 42 in advance of the operation of the switch 43 by the cam 37. The operation of the switch 43 not only stops the machine but it energizes the solenoid 28 (Figure 6) which disengages the clutch 27. It also energizes the motor 51 which through its pinion 52 and a gear 53 keyed to the shaft 21 will rotate the gear 34 and all connected parts in a clockwise direction until the cam 36 has been brought into engagement with the stop 50. A time delay switch will then operate to de-energize the solenoid 28 and motor 51. The wiring diagram for this form of invention is substantially the same as that for the form of my invention shown in Figures 7 to 13, which will be described next.

The form of my invention shown in Figures 7 to 13 inclusive will now be described. In many respects this form is similar to the form just described but there are changes in some of the details of construction which, in my opinion, make it a more compact and practical device to operate. There are also certain additions in this form which were not in the first form. This form was designed and constructed after the form just described was built and put into use. By studying the operation of the form shown in Figures 1 to 6 I was able to make minor improvements therein which, in my opinion, made a smoother and nicer operating mechanism. The general principles of the two mechanisms are the same.

Referring now to Figures 7 to 13, the numeral 60 indicates a casing having a cover 61 hingedly secured thereto. The casing 60 is adapted to be secured to the feeding mechanism 10 in a position such that the mechanism therein can be operated by the stock through the roller 17 and shaft 21. A second casing 62 is secured within the upper part of the casing 60. A shaft 63 is mounted in bearings 64 and 65. A gear 66 is keyed to shaft 63 as indicated at 67. This gear has a pair of cams 68 and 69 secured to the front face thereof, and it has a block 70 secured to the rear face thereof. This block 70 will engage a stop 71 so as to determine the position to which the gear 66 and the parts carried thereby will be returned after each measuring stroke.

A worm gear 72 having an enlarged elongated hub 73 is rotatably mounted in a bearing 74 which is carried by a transverse web 75 near the bottom of the casing 60. The hub 73 has an enlarged bore 76 through which the shaft 63 extends. The worm gear 72 meshes with a worm 77 on a shaft 78 suitably journaled in bearings within the casing 60. The worm 77 is adapted to be rotated by means of a crank pin 79 secured to a crank disc 80 pinned to the outer end of the shaft 78. The rotation of the worm 77 will rotate the worm gear 72. Secured to the rear face of the worm gear 72 is a pair of switch members 81 and 82. The switch member 81 has an operating arm 83, having a roller 84 rotatably secured to the free end thereof, and the switch 82 has an operating arm 85, with a roller 86 rotatably secured to the free end thereof. Secured to the opposite or front face of the worm gear 72 is a ring 87 of insulating material in which is suitably mounted three brass rings 88. These brass rings 88 are electrically connected in any suitable manner to the contacts within the switches 81 and 82. An insulated block 89 is secured within an opening 90 in the transverse web 75. This block 89 carries three contacts 91 which are spring pressed into engagement with the brass rings 88. The proper wires are attached to the contacts 91. A disc 92 which is calibrated in any suitable manner, as indicated at 93 (Figure 13) is secured to the outer end of the elongated hub 73 of the worm gear 72, and a hand 94, which cooperates with the calibrations 93 to indicate the amount of stock that is being fed, is rigidly secured to the outer end of the shaft 63.

Figure 9:
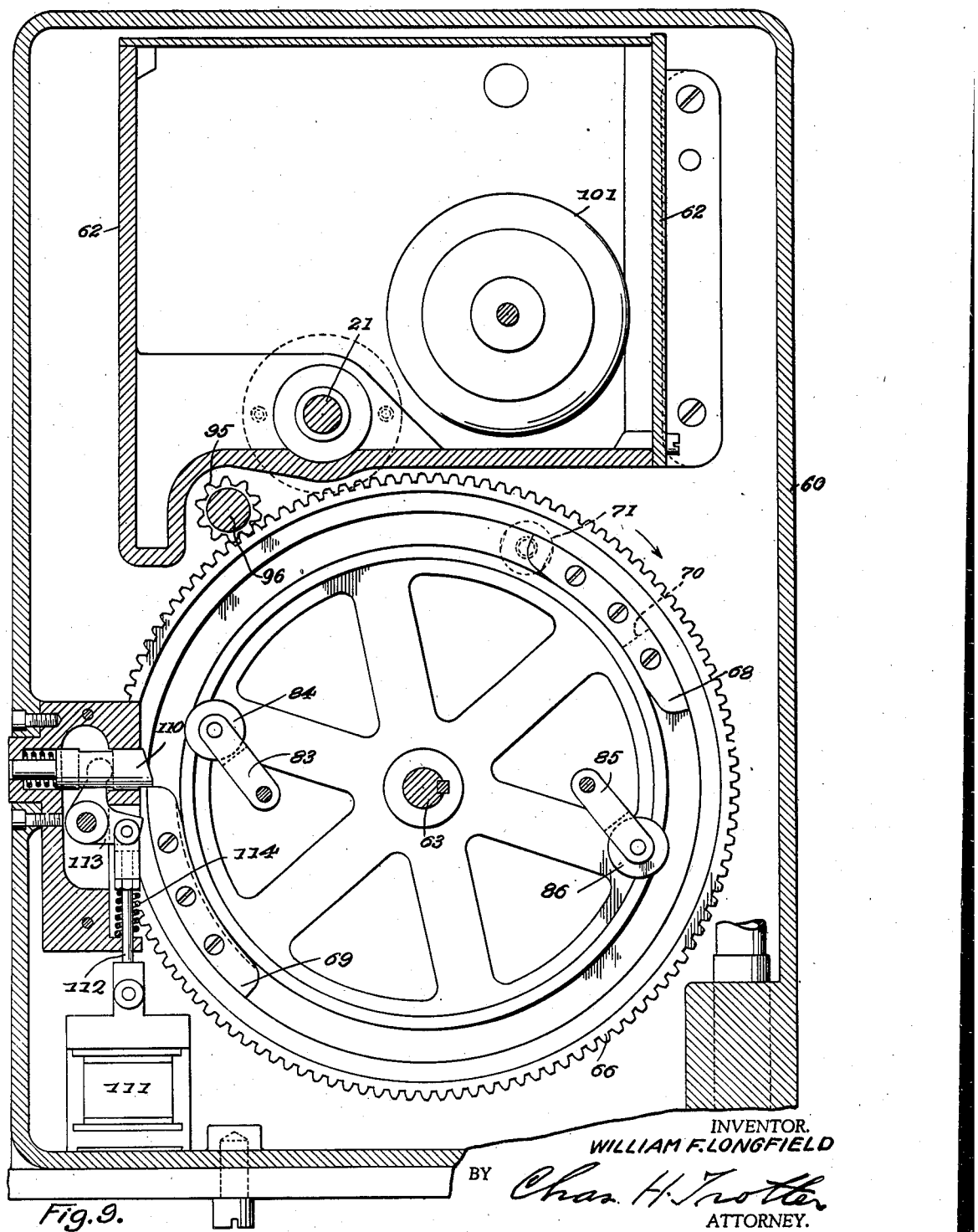
Figure 9 is a transverse section taken on the line 9—9 of Figure 8.
Figure 10:
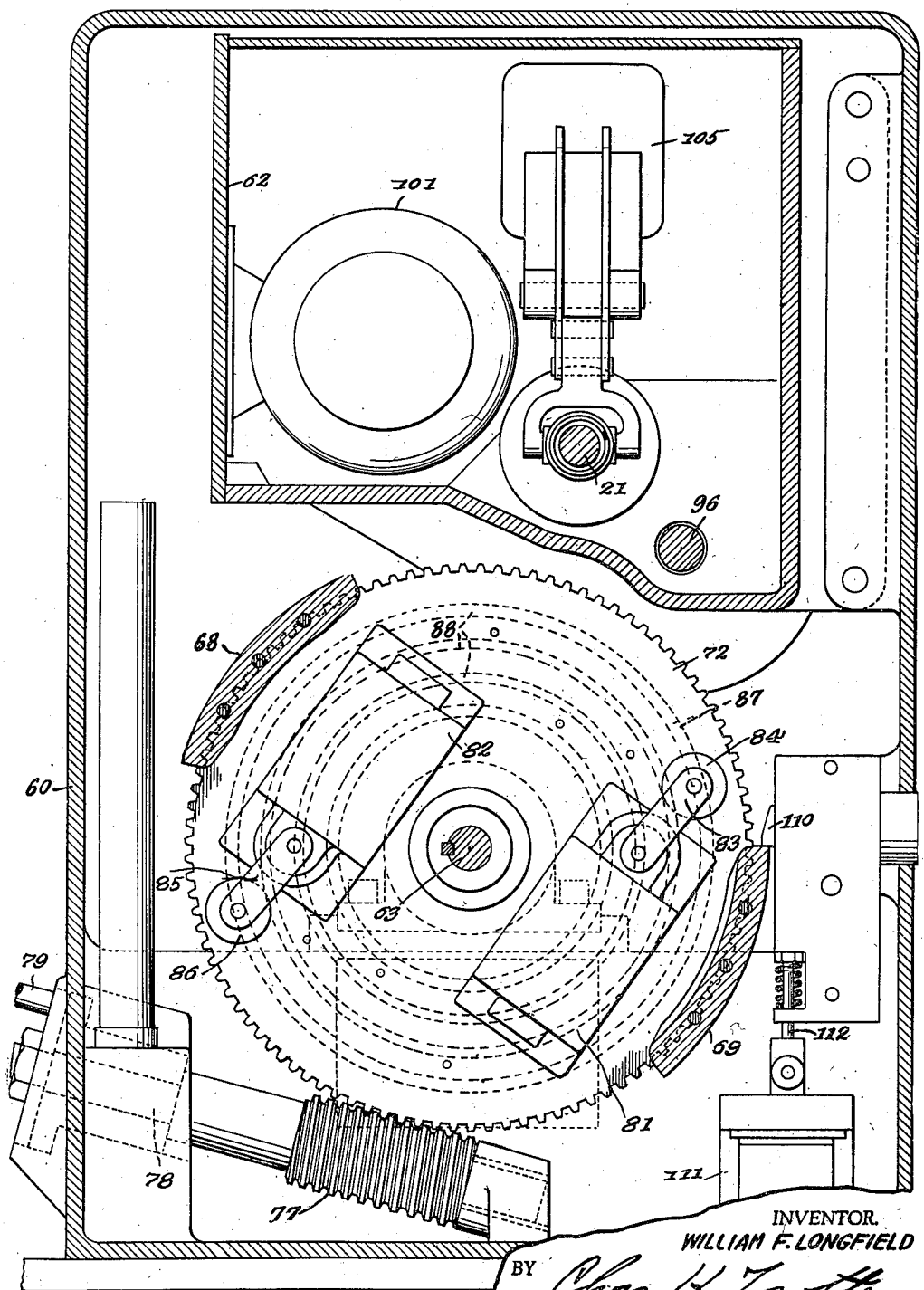
Figure 10 is a transverse sectional view taken substantially in the same plane as Figure 9 but looking in the opposite direction.

The gear 66 meshes with the small gear 95 secured to a shaft 96 journaled within the casing 62. A gear 97 is keyed to the opposite end of the shaft 96 and this gear 97 meshes with a gear 21ª on the shaft 21 so that when shaft 21 is rotated by the movement of the stock the gear 66 and the cams thereon will also be rotated in a clock-wise direction (Figures 7 and 9). In this form of my invention a gear 98 is keyed to the shaft 21 adjacent to the gear 21ª. This gear 98 meshes with a gear 99 which is secured to the armature shaft 100 of a motor 101 by a friction clutch 102.

A clutch 103 which is spring pressed into engagement by a spring 104 and is disengaged by a solenoid 105 is mounted within the casing 62 on the shaft 21 closely adjacent the gear 21ª.

The operation of this form of my invention is as follows: The parts are in the starting position as is shown in Figures 7 and 9. The movement of the stock by the rollers 15 rotates the gear 66 in a clock-wise direction through the roller 17, shaft 21 and gear 21ª secured thereto. This in turn will rotate the cams 68 and 69. After a predetermined amount of rotation, the cam 69 will engage the roller on the lever 83 which will operate the switch 81. This will slow down the driving motor 23 of the rolls 15 so that the stock will be fed from there on at a slower speed. After a predetermined additional movement of the gear 66, the cam 68 will engage the roller 86, and through the lever 85 will operate the switch 82, which will stop the machine.

The operation of the switch 82 not only stops the rotation of the rolls 15 but it energizes the solenoid 105 which disengages the clutch 103 and it energizes the motor 101, which through the gears 98, 99, 21ª, 97 and 95 will return the gear 66 back to its starting position, that is with the lug 70 carried on the gear 66 in engagement with the stop 71 secured to the casing 60. It has been found that when the lug 70 engages the stop 71, there is a tendency for the parts to bounce or rebound. This will cause an inaccurate measurement of the next piece of stock. Consequently I have provided means for preventing this bounce. This consists of a plunger 110 which is moved to the position shown in Figure 9 by a solenoid 111 which is connected by a link 112 to one arm of a bell crank 113, which has its other arm connected to the plunger 110. In Figures 7 and 9 the plunger 110 is shown in the position it assumes only during the return of the gear 66 to starting position. After the gear 66 has been returned to starting position, the solenoid 111 is de-energized and the spring 114 will move the plunger 110 through the bell crank 113 to the left and out of engagement with the cam 69. This device operates as follows: It is so positioned relative to the stop 71 and lug 70 that just as the lug 70 engages the stop 71, the plunger 110 will engage the cam 69, as shown in Figure 9, which will prevent any rebound due to the lug 70 striking the stop 71.

It will be apparent that in order to vary the length of stock to be fed in the machine, it is only necessary to change the position of the switches 81 and 82 with respect to the starting position of the cams 68 and 69. The farther away these are from the starting position of these cams, the longer will be the strip of stock fed into the press and vice versa. The position of these switches is varied by rotating the worm gear 72 upon which they are carried, which is done by rotating the worm 77 by the crank pin 79. The rotation of the worm gear 72 will also rotate the calibrated dial 92 which will give one a visible indication of the length of stock that the machine is set to feed.

The operation of the form shown in Figures 7 to 13 inclusive, will now be described with reference to the wiring diagram shown in Figure 12. The wiring diagram for the form shown in Figures 1 to 6 inclusive, will be exactly the same as that shown in Figure 12 with the solenoid 111 omitted so that the description of the operation of the form shown in Figures 7 to 13 by reference to the Figure 12 will also suffice for the description of the operation of the form shown in Figures 1 to 6. At the beginning of the cycle, the parts are all in their initial position, as shown in the various figures and the diagram in Figure 12 shows all the various parts in their initial position. To start the machine the operator pushes a push button switch 120, and current then flows from the line 121 through 122, the switch 120, line 123 through the solenoid or relay 124, line 125, and back to the main line 126. This will energize the solenoid or relay 124 which will close the switch 127 and the switch 128. This sets up a holding circuit through the sitches 81 and 127 for the relay 124 so that the switch 120 can be opened. When the switch 128 is closed by the relay 124, the high-speed winding 22ª of the motor 22 will be energized and current will flow from the main line 121 through line 129, and through the high speed winding 22ª of the motor 22 and thence through line 130 through the switch 128 and line 131 back to the other side of the main line 126. This will rotate the rolls 15 of the feeding mechanism and the stock will be fed into the press. This in turn will operate the gear 66 and the cams 68 and 69. After a predetermined amount of stock has been fed, depending on the setting of the mechanism, switch 81 will be operated to break the connection between the contacts 132 and 133 and bridge the contacts 134 and 135. This will open the switches 127 and 128, energizing the slow speed winding 22ᵇ of the motor 22. Current will flow from one side 121 of the main line through line 129 and through the slow speed winding 22ᵇ of the motor 22 and thence through line 136 to contact 134 to contact 135, line 137 to contact 138 through switch bar 139 to contact 140 and through line 141 back to the other side 126 of the main line. Material will then be fed at slow speed until the switch 82 is operated to bridge the contacts 142 and 143 therein. The closing of the switch 82 by the operation of the cam 68 will energize solenoid 144 to break the connection between the contacts 138 and 140 and to make connection between the contacts 145 and 146. When the connection between the contacts 138 and 140 is broken, the circuit to the slow speed winding of the motor 22 will be broken and the motor will stop thus stopping the rotation of the rolls 15 and, consequently, the feeding of the stock. The operation of the switch 82, as stated before, energizes the solenoid 144 to cause the switch bar 139 to bridge the contacts 145 and 146. This will energize the solenoid 105 which operates the clutch 103 and breaks the connection between the roller 17 and the gear 21ª so that the parts can be returned to the initial position without rotating the whole shaft 21 and roller 17 which would not be possible with a fractional horse-power motor such as is used in this instance. It also operates solenoid 111 which will project the plunger 110 into the position shown in Figure 9 so that it will engage the cam 69 upon its return to initial position and prevent any rebound. It will also energize the motor 101 which will return the gear 66 and any related parts to their initial position so that a new cycle of operation can be initiated by operating the push button 120. The dash pot 147 will operate to keep the contacts 145 and 146 closed by the switch bar 149 a sufficient time after the connection between the contacts 142 and 143 has been broken to enable the motor 101 to return the gear 66 to its initial position. The dash part is so set that the motor 101 will even run for a short time after the gear 66 has reached its initial starting position. This is permissible due to the friction clutch 102 between the armature shaft 100 and the gear 99.

In Figures 14 to 15 I have shown, more or less diagrammatically, another form of my invention. In this form of my invention, the gear 21ª on the shaft 21 operates a rack 150 which is suitably supported in a casing 151 and carries an elongated cam member 152. This cam member will successfully operate switches 153 and 154 which are carried on a block 155 which may be adjusted by means of a screw 156 and crank 157. In this form the operation of the switch 153 will slow down the feeding of the stock and the operation of the switch 154 will stop the feeding of the stock and will operate mechanism to return the rack 150 back to its initial position in readiness for a new cycle.

It is to be understood that I do not limit myself to any particular form of the invention shown herein, but that I am limited only by the scope of the appended claims.

Having thus described my invention, what I claim is:

1. In a feeding mechanism for sheet metal, the combination of a plurality of feeding rolls, means for driving said rolls at high or low speed, a roll spring pressed into engagement with the stock being fed by said feeding rolls, and adapted to be rotated by the movement of said stock, a rotatable member, operative connections between said rotatable member and said spring pressed roll through which the rotatable member is rotated by the rotation of said spring pressed roll, an adjustable member, a pair of switches carried by said member, means on said rotatable member for successively operating said switches and means operated by the operation of said switches for controlling the operation of said feeding rolls.

2. In a feeding mechanism for sheet metal, the combination of a plurality of feeding rolls, means for driving said rolls at high or low speed, a roll spring pressed into engagement with the stock being fed by said feeding rolls, and adapted to be rotated by the movement of said stock, a rotatable member, operative connections between said rotatable member and said spring pressed roll through which the rotatable member is rotated by the rotation of said spring pressed roll, an adjustable member, a pair of switches carried by said member, means on said rotatable member for successively operating said switches, and means operated by the operation of said switches for disconnecting said rotatable member from said spring pressed roll and for returning said rotatable member to its starting position.

3. In a sheet metal strip feeding mechanism, the combination of a plurality of feeding rolls, means for driving said rolls at high or low speed, a rotatable member which is moved in one direction proportional to the feeding of a strip by the movement of said strip, an adjustable member and means for adjusting said member, a pair of switches rigidly secured to said adjustable member and moveable therewith, means on said rotatable member for successively operating said switches, means operated by the operation of said switches for controlling the operation of said roll driving means, and means for stopping the rotation of said rolls.

4. In a strip feeding mechanism, the combination of a plurality of feeding rolls, means for driving the rolls at either high or low speed, a measuring roll spring pressed into engagement with the strip being fed and rotated thereby, a rotatable member, operative connections between said measuring roll and said rotatable member, through which said rotatable member is rotated by the rotation of said measuring roll, an adjustable member and means for adjusting said member, a pair of switches rigidly secured to and moveable with said adjustable member, means carried by said rotatable member for successively operating said switches, means operated by the closing of one of said switches for changing the speed of rotation of the feeding rolls from high speed to low speed and means operated by the closing of the other of said switches for stopping rotation of said feeding rolls.

5. In a strip feeding mechanism, the combination of a plurality of feeding rolls, means for driving the rolls at either high or low speed, a measuring roll spring pressed into engagement with the strip being fed and rotated thereby, a rotatable member, operative connections between said measuring roll and said rotatable member, through which said rotatable member is rotated by the rotation of said measuring roll, an adjustable member and means for adjusting said member, a pair of switches rigidly secured to and moveable with said adjustable member, means carried by said rotatable member for successively operating said switches, means operated by the closing of one of said switches for changing the speed of rotation of the feeding rolls from high speed to low speed and means operated by the closing of the other of said switches for stopping rotation of said feeding rolls, and means operated by the opening of one of said switches for disconnecting the rotatable member from said measuring roll and means also operated by the closing of said last mentioned switch for returning said rotatable member to starting position.

6. In a strip feeding mechanism, the combination of a plurality of feeding rolls, means for rotating said rolls at a high speed, means for rotating said rolls at a low speed, measuring roll spring pressed into engagement with the stock being fed by the feeding rolls and adapted to be rotated by the movement of said stock, a rotatable member, a stationary abutment, a projection on said rotatable member for engagement with said stationary abutment when the rotatable member is at starting position, and operative connections between said measuring roll and said rotatable member for rotating said rotatable member in one direction proportional to the rotation of said measuring roll, an adjustable member, means for adjusting said member, a switch rigidly secured to said adjustable member, a second switch rigidly secured to said adjustable member in spaced relation to said first mentioned switch, means carried by said rotating member for operating first mentioned switch and then operating said second mentioned switch, means operated by the closing of said first mentioned switch for disconnecting the high speed drive from said feeding rolls and connecting the low speed drive to said feeding rolls and means operated by the closing of said second mentioned switch for stopping the rotation of said feeding rolls.

7. In a strip feeding mechanism, the combination of a plurality of feeding rolls, means for rotating said rolls at a high speed, means for rotating said rolls at a low speed, measuring roll spring pressed into engagement with the stock being fed by the feeding rolls and adapted to be rotated by the movement of said stock, a rotatable member, a stationary abutment, a projection on said rotatable member for engagement with said stationary abutment when the rotatable member is at starting position, and operative connections between said measuring roll and said rotatable member for rotating said rotatable member in one direction proportional to the rotation of said measuring roll, an adjustable member, means for adjusting said member, a switch rigidly secured to said adjustable member, a second switch rigidly secured to said adjustable member in spaced relation to said first mentioned switch, means carried by said rotating member for operating first mentioned switch and then operating said second mentioned switch, means operated by the closing of said first mentioned switch for disconnecting the high speed drive from said feeding rolls and connecting the low speed drive to said feeding rolls and means operated by the closing of said second mentioned switch for stopping the rotation of said feeding rolls, and means also operated by said second mentioned switch for disconnecting said rotatable member from said measuring roll and for returning the rotatable member to starting position.

8. A measuring device for controlling the operation of mechanism for feeding strip material, including a rotatable member and means for rotating said member in one direction proportional to the feeding of the material, an adjustable member, a pair of switches secured to said adjustable member and positioned thereon for successive actuation by said rotatable member during rotation thereof, means operated by the operation of one of said switches to reduce the speed of said strip feeding mechanism whereby the feeding of the material takes place at a slower speed, and means operated by the operation of the other of said switches to stop said mechanism.

9. In a device of the character described, the combination of a strip feeding mechanism and means for controlling the operation of said strip feeding mechanism comprising, a movable member, interconnecting means between said strip feeding mechanism and said moveable member for moving said moveable member in one direction proportional to feeding of a strip by the strip feeding mechanism, an adjustable member, a pair of switches carried by said adjustable member, means on said moveable member for successively actuating said switches during the movement of said moveable member, means operated by the operation of one of said switches to reduce the speed of the strip feeding mechanism whereby the feeding of material by said mechanism takes place at a slower speed and means operated by the operation of the other of said switches to stop said strip feeding mechanism.

10. In a device of the character described, the combination of a strip feeding mechanism, and means for controlling the operation thereof comprising, a moveable member, interconnecting means between said moveable member and said strip feeding mechanism for moving said moveable member in one direction proportional to the feeding of a strip by said strip feeding mechanism, a stop against which said moveable member abuts when in initial position, a pair of switches, means on said moveable member for successively actuating said switches during the movement of said moveable member, means for selectively adjusting the position of said switches with respect to said stop, whereby said moveable member will be moved a greater or lesser distance as desired before actuating said switches, means operated by the operation of one of said switches to reduce the speed of said mechanism whereby the feeding of the material takes place at a slower speed and means operated by the operation of the other of said switches to stop said mechanism.

11. In a device of the character described, the combination of a strip feeding mechanism, and means for controlling the operation thereof comprising, a moveable member, interconnecting means between said moveable member and said strip feeding mechanism for moving said moveable member in one direction proportional to the feeding of a strip by said strip feeding mechanism, a stop against which said moveable member abuts when in initial position, a pair of switches, means on said moveable member for successively actuating said switches during the movement of said moveable member, means for selectively adjusting the position of said switches with respect to said stop, whereby said moveable member will be moved a greater or lesser distance as desired before actuating said switches during the movement of said moveable member, means for selectively adjusting the position of said switches with respect to said stop, whereby said moveable member will be moved a greater or lesser distance as desired before actuating said switches, means operated by the operation of one of said switches to reduce the speed of said mechanism whereby the feeding of the material takes place at a slower speed and means operated by the operation of the other of said switches to stop said mechanism; the said second switch being also operative when actuated to return said moveable member to its initial position.

12. In a device of the character described, the combination of a strip feeding mechanism, and means for controlling the operation thereof comprising, a moveable member, interconnecting means between said moveable member and said strip feeding mechanism for moving said moveable member in one direction proportional to the feeding of a strip by said strip feeding mechanism, a stop against which said moveable member abuts when in initial position, a pair of switches, means on said moveable member for successively actuating said switches during the movement of said moveable member, means for selectively adjusting the position of said switches with respect to said stop, whereby said moveable member will be moved a greater or lesser distance as desired before actuating said switches, means operated by the operation of one of said switches to reduce the speed of said mechanism whereby the feeding of the material takes place at a slower speed, means operated by the operation of the other of said switches to stop said mechanism, means also operated by the operation of the said other of said switches to disconnect said moveable member from said strip feeding mechanism, and means for returning said moveable member to its initial position.

13. In a device of the character described, the combination of a strip feeding mechanism and means for controlling the operation thereof comprising, a shaft, a gear rigidly secured to said shaft, interconnecting means between said gear and said strip feeding mechanism for rotating said gear in one direction proportional to the feeding of the material, a pointer rigidly secured to said shaft, said pointer cooperating with indicia to indicate the amount of movement of the material, a second gear rotatably supported on said shaft, a pair of switches rigidly secured to said second gear in spaced relation to each other, means carried by said first mentioned gear for successively actuating said switches during the rotation of said first mentioned gear, means for rotating said second mentioned gear and locking it in any desired position whereby the movement of said first mentioned gear may be varied before actuation of said switches, means operated by the operation of one of said switches to reduce the speed of said strip feeding mechanism whereby the feeding of the material takes place at a slower speed and means operated by the operation of the other of said switches to stop said mechanism.

14. In a device of the character described, the combination of a strip feeding mechanism and means for controlling the operation thereof comprising, a shaft, a gear rigidly secured to said shaft, interconnecting means between said gear, and said strip feeding mechanism for rotating said gear in one direction proportional to the feeding of the material, a pointer rigidly secured to said shaft, said pointer cooperating with indicia to indicate the amount of movement of the material, a second gear rotatably supported on said shaft, a pair of switches rigidly secured to said second gear in spaced relation to each other, means carried by said first mentioned gear for successively actuating said switches during the rotation of said first mentioned gear, means for rotating said second mentioned gear and locking it in any desired position whereby the movement of said first mentioned gear may be varied before actuation of said switches, means operated by the operation of one of said switches to reduce the speed of said strip feeding mechanism whereby the feeding of the material takes place at a slower speed, means operated by the operation of the other of said switches to stop said mechanism, and means for returning said first mentioned gear to initial position upon actuation of said second mentioned switch.

15. In a device of the character described, the combination of a strip feeding mechanism and means for controlling the operation thereof comprising, a shaft, a gear rigidly secured to said shaft, a measuring roller positioned for actuation by material being fed by said feeding mechanism, interconnecting means between said measuring roller and said gear for rotating said gear proportional to the rotation of said measuring roller, said interconnecting means including a clutch, a second gear rotatably supported by said shaft, a switch rigidly secured to said second mentioned gear, a second switch rigidly secured to said second mentioned gear in spaced relation to said first mentioned switch, means carried by said first mentioned gear for successively actuating said switches during the rotation of said first mentioned gear by said measuring roller, means for rotating said second mentioned gear so as to vary the position of said switches with respect to the switch actuating means carried by said first mentioned gear when first mentioned gear is in its initial position, means operated by the operation of said first mentioned switch to reduce the speed of said strip feeding mechanism whereby the feeding of the material takes place at a slower speed, means operated by the operation of said second mentioned switch to stop said strip feeding mechanism, means also operated by the operation of said second mentioned switch to disengage said clutch, and means for returning said first mentioned gear to initial position after said clutch has been disengaged.

WILLIAM F. LONGFIELD.